Sept. 19, 1944.   J. F. BYERS   2,358,303
STOCK WATERING DEVICE
Filed May 21, 1943

Inventor
Joseph Frank Byers,

By McMorrow and Berman
Attorneys

Patented Sept. 19, 1944

2,358,303

UNITED STATES PATENT OFFICE 2,358,303

STOCK WATERING DEVICE

Joseph F. Byers, Aurora, Nebr.

Application May 21, 1943, Serial No. 487,935

1 Claim. (Cl. 119—73)

This invention relates to a stock watering device, and has for the primary object the provision of a device of the above stated character which will provide sufficient warmth to the water in cold weather without the use of artificial heating means to reduce to a minimum the possibility of the water freezing and ice forming to an extent as to require cutting of ice from the device and also provides warmer water for the stock to drink besides reducing to a minimum the possibility of the water becoming contaminated by foreign matter.

With these and other objects in view as will become more apparent as the description proceeds, the invention consists in certain novel features of construction, combination and arrangement of parts as will be hereinafter more fully described and claimed.

For a complete understanding of my invention, reference is to be had to the following description and accompanying drawing, in which Figure 1 is a top plan view partly broken away illustrating a stock watering device constructed in accordance with my invention.

Figure 1:
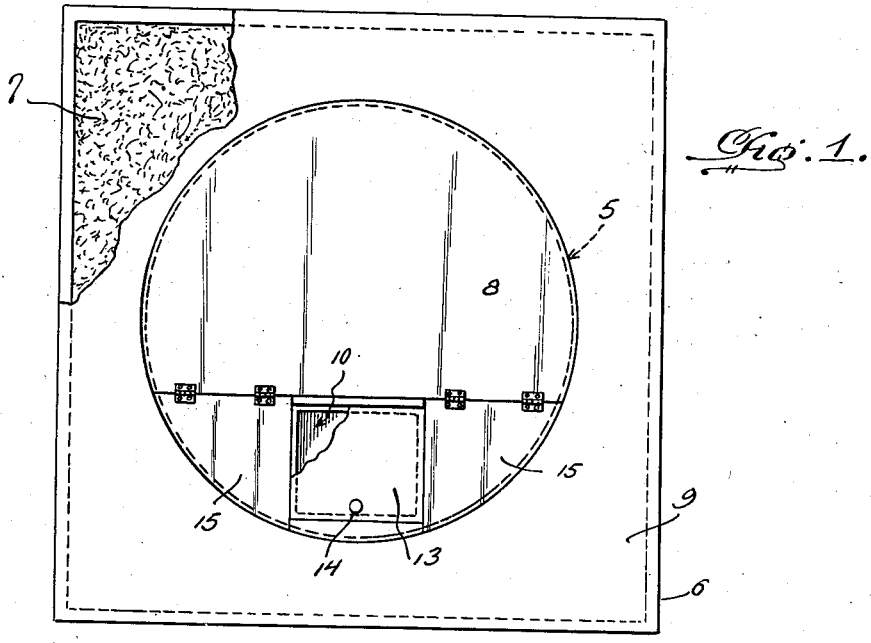
Figure 2:
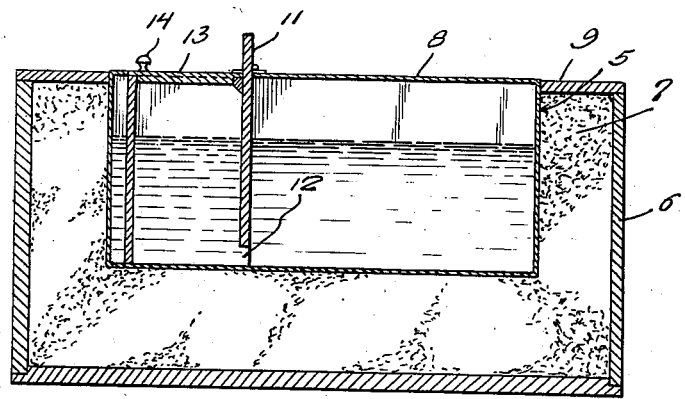
Figure 2 is a transverse sectional view illustrating the device.
Figure 3:
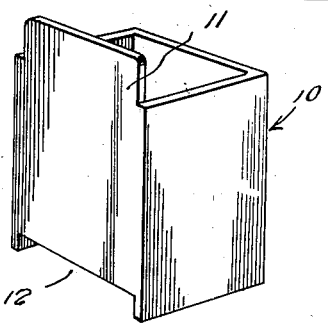
Figure 3 is a perspective view illustrating a drinking compartment forming device.

Referring in detail to the drawing, the numeral 5 indicates a tank or container for containing drinking water for stock and is arranged within a casing 6, the major portion of which is spaced from the tank or container 5, as clearly shown in Figure 2. Insulating material 7 fills the space between the container or tank and the casing to protect the water within said tank or container against cold temperature.

The major portion of the tank or container is closed by a top wall 8 forming an integral part of said tank or container leaving approximately less than one-third of said tank or container open. The top wall 8 is flush with the top wall 9 of the casing.

A drinking chamber-forming device is positioned within the tank or container and is exposed by the uncovered portion of the tank or container and in which the stock one at a time may reach the water for drinking. The device 10 is fully open at its upper and lower ends with one vertical wall thereof protruding above the top wall 8 of the tank or container, as shown at 11, to provide a finger piece for lifting the device 10 out of the tank or container whenever desired. Said wall of the device 10 terminates short of the bottom wall of the tank or container to form an entrance 12 whereby the water of the tank or container may flow within the device 10 and obtain a level corresponding to the level of the water within the tank or container. The entrance 12 being located lowermost will permit the warmest water which is adjacent to the bottom of the tank or container to enter the device 10 for drinking purposes by the stock.

The device 10 may be closed whenever desired by a removable cover 13 having a finger piece 14.

Hinged to the top wall 8 of the tank or container are closures 15 normally acting to cover the portion of the tank or container located at opposite sides of the device 10 for the purpose of excluding foreign matter but which will give access to the interior of the tank for the replenishing of water therein or for cleaning the interior of the tank or container when necessary. The device 10 being removable from the tank or container and the covers 15 being hingedly mounted, allows a considerable portion of the tank to be opened for cleaning purposes.

The water within the tank or container being protected against cold temperatures by the insulating material 7 will retard the formation of ice and maintain the water at a warmer temperature for the stock to drink which is essential to the health of the stock.

As only a limited area of the water within the tank is exposed when the device is in use for the stock drinking from the device, the possibility of foreign matter entering the tank or container and contaminating the water is reduced to a minimum.

While I have shown and described the preferred embodiment of my invention, it will be understood that minor changes in construction, combination and arrangement of parts may be made without departing from the spirit and scope of the invention as claimed.

Having thus described the invention, what I claim is:

In a stock watering device, a circular tank including a top cover wall closing approximately two-thirds of the upper end of said tank, an insulated casing receiving the tank therein and provided with a circular opening receiving said tank at the open end thereof and exposing said open end, a substantially rectangular shaped drinking chamber supported by the bottom wall of the tank and including vertically arranged connected walls and having one wall terminating short of the other walls and spaced from the bottom of the tank to admit water from the latter into said chamber, said last mentioned wall bearing against an edge of the top cover wall and terminating in a plane thereabove to form a finger piece for lifting the chamber from the tank, and covers hinged on said edge of the top cover wall and engaging walls of said chamber to close the uncovered portions of the tank and to prevent said chamber from being shifted in the tank by an animal drinking therefrom.

JOSEPH F. BYERS.